United States Patent
Griesbach, III et al.

(10) Patent No.: US 6,764,566 B1
(45) Date of Patent: Jul. 20, 2004

(54) NONWOVEN FILLED FILM LAMINATE WITH BARRIER PROPERTIES

(75) Inventors: Henry L. Griesbach, III, Clarkston, GA (US); Rasha Wafik Guirguis, Alpharetta, GA (US); Casey L. Dusenbery, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 211 days.

(21) Appl. No.: 10/020,814

(22) Filed: Dec. 12, 2001

(51) Int. Cl.[7] .................. B32B 31/08; B32B 31/12; B32B 33/00
(52) U.S. Cl. .................................... 156/229
(58) Field of Search .............................. 156/182, 229, 156/290; 264/45.1, 45.8, 164; 604/322, 358, 367, 378

(56) References Cited

U.S. PATENT DOCUMENTS

| | | |
|---|---|---|
| 3,661,627 A | 5/1972 | Schwarz |
| 3,727,239 A | 4/1973 | Thompson |
| 3,809,077 A | 5/1974 | Hansen |
| 3,902,484 A | 9/1975 | Winters |
| 4,041,203 A | 8/1977 | Brock et al. |
| 4,196,245 A | 4/1980 | Kitson et al. |
| 4,379,192 A | 4/1983 | Wahlquist et al. |
| 4,389,734 A | 6/1983 | Franz et al. |
| 4,610,915 A | 9/1986 | Crenshaw et al. |
| 4,753,840 A | 6/1988 | Van Gompel |
| 4,845,780 A | 7/1989 | Reimers et al. |
| 5,151,314 A | 9/1992 | Brown |
| 5,409,761 A | 4/1995 | Langley |
| 5,467,483 A | 11/1995 | Saadatmanesh et al. |
| 5,492,753 A | 2/1996 | Levy et al. |
| 5,503,907 A | 4/1996 | Gessner et al. |
| 5,546,960 A | 8/1996 | Billgren |
| 5,572,743 A | 11/1996 | Yavitz |
| 5,628,067 A | 5/1997 | Meyer et al. |
| 5,693,401 A | 12/1997 | Sommers et al. |
| 5,698,481 A | 12/1997 | Van Hout et al. |
| 5,728,081 A | 3/1998 | Baer et al. |
| 5,733,822 A | 3/1998 | Gessner et al. |
| 5,734,992 A | 4/1998 | Ross |
| 5,749,866 A * | 5/1998 | Roe et al. .............. 604/385.24 |
| 5,759,926 A | 6/1998 | Pike et al. |
| 5,786,058 A | 7/1998 | Megchelsen et al. |
| 5,814,567 A | 9/1998 | Yahiaoui et al. |
| 5,891,812 A | 4/1999 | Honeycutt et al. |

(List continued on next page.)

FOREIGN PATENT DOCUMENTS

| | | |
|---|---|---|
| EP | 0 507 607 A1 | 10/1992 |
| WO | WO 96/09165 A1 | 3/1996 |
| WO | WO 97/09173 | 3/1997 |
| WO | WO 98/29480 | 7/1998 |
| WO | WO 00/20208 | 4/2000 |

Primary Examiner—Richard Crispino
Assistant Examiner—Sing P. Chan
(74) Attorney, Agent, or Firm—Scott B. Garrison (57) ABSTRACT

The present invention is directed to a method of manufacturing a single-use, disposable absorbent laminate containing one or more layers of hydrophilic meltspun material bonded to a breathable film. The meltspun fabric layer may include at least one spunbonded fabric, meltblown fabric or other nonwoven fabric that is made hydrophilic prior to bonding to the film. The filaments or microfibers of the spunbonded or meltblown fabrics may contain a hydrophilic additive in or on the filaments or microfibers. The film of the surgical drape remains breathable while enabling the laminate to resist penetration by liquids and viruses.

19 Claims, 5 Drawing Sheets

U.S. PATENT DOCUMENTS

| | | |
|---|---|---|
| 5,901,706 A | 5/1999 | Griesbach et al. |
| 5,948,707 A | 9/1999 | Crawley et al. |
| 6,002,064 A | 12/1999 | Kobylivker et al. |
| 6,045,900 A | 4/2000 | Haffner et al. |
| 6,071,450 A | 6/2000 | Topolkaraev et al. |
| 6,072,005 A | 6/2000 | Kobylivker et al. |
| 6,075,179 A | 6/2000 | McCormack et al. |
| 6,107,268 A * | 8/2000 | Yahiaoui et al. ............ 510/438 |
| 6,187,696 B1 | 2/2001 | Lim et al. |
| 6,190,758 B1 | 2/2001 | Stopper |
| 6,204,208 B1 | 3/2001 | Krzysik et al. |
| 6,238,767 B1 | 5/2001 | McCormack et al. |

* cited by examiner

NONWOVEN FILLED FILM LAMINATE WITH BARRIER PROPERTIES

BACKGROUND OF THE INVENTION

The present invention is directed to a single-use, disposable absorbent laminate containing a nonwoven web bonded to a breathable film. Such laminates have a wide variety of uses, especially in the areas of limited use and disposable items including, but not limited to, surgical and health care related products such as surgical drapes and gowns, disposable work wear such as coveralls and lab coats and personal care absorbent products such as diapers, training pants, incontinence garments, sanitary napkins, bandages, wipes and the like. Many of these products require highly engineered components and yet, at the same time, are required to be limited use or disposable items. By limited use or disposable, it is meant that the product and/or component is used only a small number of times or possibly only once before being discarded.

For example, surgical drapes have been designed to greatly reduce, if not prevent, the transmission of liquids through the surgical drape. In surgical procedure environments, such liquid sources include patient liquids such as blood, saliva and perspiration, and life support liquids such as plasma and saline. In earlier times, surgical drapes were made of cotton or linen. Surgical drapes fashioned from these materials, however, permitted transmission or "strike-through" of various liquids encountered in surgical procedures. In these instances, a path was established for transmission of biological contaminates, either present in the liquid or subsequently contacting the liquid, through the surgical drape. Additionally, in many instances, surgical drapes fashioned from cotton or linen provided insufficient barrier protection from the transmission therethrough of airborne contaminates. Furthermore, these articles were costly, and of course laundering and sterilization procedures were required before reuse.

Presently, disposable surgical drapes have largely replaced linen surgical drapes. Advances in such disposable surgical drapes include the formation of such articles from liquid absorbent fabrics and/or liquid impervious films which prevent liquid strike-through. For example, see JP 8080318 assigned to Kyowa Hakko Kogyo K K; U.S. Pat. No. 5,546,960 assigned to Molnlycke A B; and WO 96/09165 assigned to Exxon. In this way, biological contaminates carried by liquids are prevented from passing through such fabrics. However, in some instances, surgical drapes formed from absorbent fabrics and/or liquid impervious films sacrifice other drape properties, such as meeting Class 1 flammability requirements per NFPA 702-1980, tear strength, being relatively "lint free" i.e., not containing loose fibrous elements. Class I flammability requirements are met when a material takes 20 seconds or greater for a flame from a standardized ignition source to spread 5 inches according to NFPA 702-1980 test conditions.

In some instances, surgical drapes fashioned from liquid absorbent fabrics alone, such as fabrics formed from hydrophilic fibers, sufficiently absorb liquids and are more breathable than nonporous materials. However, the breathability provided by such nonwoven fabrics has generally occurred at the expense of liquid barrier properties of the drape. The desire for improved liquid absorptivity and fluid impervious barrier properties has resulted in the lamination of absorbent nonwoven webs to various film or barrier layers. One commercially available application of this configuration is used in the creation of surgical drapes. The surgical drape sold under the tradename Klinidrape® and assigned to Molnlycke AB, is believed to comprise a liquid absorbent nonwoven top sheet containing inherently hydrophilic rayon staple (discontinuous) fibers, a fluid-impermeable intermediate sheet of polyethylene, a bottom sheet of cellulose, and adhesive components to attach the top and bottom sheets to the polyethylene sheet. Although the above described Klinidrape® has liquid absorptivity and fluid impermeability, the drape produces relatively numerous lint particles, relies upon adhesive type bonds, and does not pass the Class 1 flammability requirements of NFPA 702-1980.

For such drapes the lamination of nonwoven fabrics to films improves the strength and fluid barrier attributes. Spunbonded fabrics containing continuous synthetic filaments have been laminated with films for consideration in surgical drape applications. Such laminate fabrics do not drastically increase the drape density and are relatively low in cost. One such laminated fabric, comprising a multilayer film bonded to a support layer, such as a hydrophobic spunbonded fabric layer, is disclosed in GB 2296216, which is assigned to Kimberly-Clark Worldwide, and is described as having applications for surgical drapes. However, since the spunbonded fabric component of the above laminate fails to exhibit hydrophilic properties, the drapes made from such laminate fabric lack fluid absorbency.

Another laminate, disclosed in WO 96/09165 and assigned to Exxon, comprises a microporous film adhesively bonded between an outer nonwoven layer containing hydrophobic spunbonded filaments and a hydrophilic nonwoven inner layer. With respect to applications as surgical drapes, the film component provides a barrier to fluid, while the spunbonded component provides strength to the drape. This laminate, however, utilizes adhesive bonding to attach the film to the nonwoven substrate.

Microporous films are well known in the art and in some embodiments typically consist of a film containing some quantity of a particulate filler material dispersed therein. These films with particulate filler material are known as filled films. Under typical processing conditions for making a filled film microporous, the particulate filled films are stretched and/or crushed between compression rollers so as create voids in and around the particles. This renders the films breathable and permits the transmission of water vapor and other gases through micropores developed in and through the film in the regions containing and proximate to the voids while normally inhibiting the transmission of liquids such as water. Filled films treated in the stretching manner typically result in breathable films having water vapor transmission rates of at least 300 grams per square meter per 24 hours (300 g/m$^2$/24 hrs).

One approach to facilitate processing and the subsequent lamination of filled films to other materials constructions is to form surface or "skin" layers on one or both sides of the filled film. Frequently these additional film layers have lower amounts of filler content or are monolithic film layers, or are combinations of both. Such multilayered filled films comprise base or "core" layers that contain pore developing fillers and skin layers that optionally contain such pore developing fillers or other fillers and additives. Typically the core layers provide the bulk of the strength and barrier attributes of the entire film while the skin layers contribute but provide additional desired attributes. Stretching and/or crushing processing conditions performed on these films can also render them films breathable. For a multilayered filled film with pore developing fillers in all layers stretching and/or crushing creates voids around the particles as described above and examples of such films are described in U.S. Pat. No. 6,045,900 by Haffner, et al. For a multilayered filled film with reduced, minimal or with no pore developing fillers present, breathability of the film can be achieved. This is done by proper selection of the polymeric components, their content contribution in each skin, and by appropriate processing of the multilayered film, for example stretching the film so that the skin layers are sufficiently thinned to permit transmission of water vapor and other gases. McCormack, et al, describes examples of such films in U.S. Pat. No. 6,075,179.

One problem has been long recognized and encountered with the above material constructions in thermal lamination to other material constructions. That problem is that known attempts to thermally point bond a nonwoven fabric layer to a microporous thermoplastic film frequently result in a laminate that fails to meet blood strikethrough requirements as described in ASTM-F1670-95. An example of this problem is cited as the comparative example in U.S. Pat. No. 6,238,767 where the use of thermal point bonding to join a multi-layer stretched thinned microporous film to a nonwoven resulted in a laminate that fails the ASTM-F1670-95 test. To surmount this problem U.S. Pat. No. 6,238,767 describes smooth roll calendering techniques that join the microporous film and the nonwoven.

The difficulty in obtaining thermal bonded laminates of nonwovens and microporous films that pass the ASTM-F1670-95 test is further increased when the nonwoven webs are treated with a fugitive surfactants. It is believed that when such webs are thermal bonded to microporous films, some portion of fugitive surfactant present on the web is driven by the heat and pressure of the thermal bonding process into the film itself at the bond areas. When liquid such as water, blood, or urine contacts this surfactant present in the microporous regions of the film the surface tension of the liquid decreases sufficiently to result in the passage of liquid through the microporous network. Such laminates fail to pass the blood strikethrough criteria set forth in ASTM-F1670-95. It is believed that the pressures and temperatures used in the thermal bonding process create intimate contact among the surfactant, the polymers of the nonwoven fabric, and the polymers and other materials present in the film at bonded regions. This is believed to result in the presence of surfactant in the microporous regions that reduces the surface tension of liquid that contacts these regions and allows the liquid to pass through the laminate.

A common technique used to negate the effect of surfactant contamination in the film is to avoid it altogether by attaching the film via an adhesive to the surfactant treated nonwoven web. So long as the bond is non-thermal and the film and surfactant treated nonwoven are physically separated, surface tension reduction of liquids in the microporous regions is eliminated or at least minimized. An alternative technique is to thermally bond the film to a surfactant free web. Once the bond is established, as a subsequent step, the film/nonwoven laminate can be topically treated with the surfactant to be rendered hydrophilic. U.S. Pat. No. 5,901,706 by Griesbach, et al, describes such laminates, made by adhesive attachment or by thermal bonding followed by surfactant treatment, suitable for surgical drapes.

Consequently, until the present invention, it was believed that microporous films thermally bonded to nonwoven webs with surfactant treatments could not reliably provide the liquid barrier necessary to enable the film/nonwoven laminate to pass the blood strikethrough criteria of ASTM-F1670-95.

SUMMARY OF THE INVENTION

The present invention is drawn to a disposable, absorbent laminate containing one or more layers of surfactant-treated meltspun nonwoven thermally bonded to a breathable film and a method of making the same. Such a laminate is useful for surgical drapes and would have applications for gowns, disposable work wear such as coveralls and lab coats and personal care absorbent products such as diapers, training pants, incontinence garments, sanitary napkins, bandages, wipes and the like. In accordance with the invention the laminate should provide superior liquid absorptivity, exhibit relatively low levels of lint particles, pass the blood strikethrough criteria of ASTM-F 1670-95, meet the Class 1 flammability requirements of NFPA 702-1980, and maximize drape strength all at a relatively low cost. As such, the present invention is drawn to a laminate comprising a nonwoven web having been treated with a surfactant and a stretched film. The stretched film comprises a core layer and at least one skin layer. The core layer has a percentage by weight of a micropore developing filler material incorporated therein. The stretched film has been stretched in at least one direction to some percentage of its original size until a desired degree of vapor permeability is reached. The film is thermally bonded to the surfactant treated nonwoven. The end result is a laminate that forms both a breathable barrier and passes blood strikethrough in compliance with ASTM F1670-95 and has an exposed face that is capable of absorbing aqueous liquids.

In another embodiment, the invention is drawn to a breathable absorbent laminate compliant with ASTM F1670-95. The laminate comprises a nonwoven web treated with a surfactant. The nonwoven web is thermally bonded at a plurality of bond points to a multilayer polyolefin resin film, at least some of the bond points form attachments between the web and the multilayer film. At least one layer of the multilayer film contains a percentage by weight of a micropore developing filler.

In other embodiments, the invention is a surgical drape consisting of a thermally bonded laminate made from a stretched multilayered filled film and a surfactant treated, hydrophilic and absorbent meltspun nonwoven web.

The laminates of the present invention satisfy the need in the art for materials that provide improved liquid absorptivity while passing blood strikethrough criteria set fort in ASTM-F1670-95, as well as, providing comfort, improved drape strength, and having relative low levels of lint particles, while meeting the Class 1 flammability requirements of NFPA 702-1980 (flame propagation of 20 seconds or greater).

The laminates of the present invention may be formed from thermal bonding a film that contains at least one microporous layer and one or more nonwoven fabric layers so as to include at least one layer of hydrophilic meltspun fabric. In general, the filaments of the contemplated nonwoven fabrics are made from hydrophobic polymeric material. These materials are made hydrophilic by treating with a hydrophilic chemical additive, such as a surfactant, in or on the filaments.

DETAILED DESCRIPTION OF THE INVENTION

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "nonwoven fabric or "web" refers to a fabric that has a structure of individual fibers or filaments which are randomly and/or unidirectionally interlaid in a mat-like fashion. Nonwoven fabrics can be made from a variety of processes including, but not limited to, air-laid processes, wet-laid processes, hydroentangling processes, staple fiber carding and bonding, and solution spinning. Suitable nonwoven fabrics include, but are not limited to, spunbonded fabrics, meltblown fabrics, wet-laid fabrics, hydroentangled fabrics, spunlaced fabrics and combinations thereof The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein, the term "meltspun fabric" refers to a nonwoven web of filaments or fibers, which are formed by extruding a molten thermoplastic material, or coextruding more than one molten thermoplastic material, as filaments or fibers from a plurality of fine, usually circular, capillaries in a spinneret with the diameter of the extruded filaments or fibers. Meltspun fabrics include, but are not limited to, spunbonded fabrics and meltblown fabrics and are characterized as having thermal bonding junctions throughout the fabric.

As used herein, the term "spunbonded fabric" or "spunbond fabric" refers to a web of small diameter continuous filaments which are formed by extruding a molten thermoplastic material, or coextruding more than one molten thermoplastic material, as filaments from a plurality of fine, usually circular, capillaries in a spinneret with the diameter of the extruded filaments rapidly reduced, for example, by non-eductive or eductive fluid-drawing or other well known spunbonding mechanisms. These small diameter filaments are substantially uniform with respect to each other. The diameters that characterize these filaments range from about 7 to 45 microns, preferably from about 12 to 25 microns. The production of spunbonded nonwoven webs is illustrated in patents such as Appel et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fabrics" refers to a fabric comprising fibers formed by extruding a molten thermoplastic material through a plurality of fine, usually circular, die capillaries as molten threads or filaments into a high velocity gas (e.g. air) stream that attenuates the filaments of molten thermoplastic material to reduce their diameters, which may be to "microfiber" diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241 issued Nov. 19, 1974 to Buntin et al.

As used herein, the term "microfibers" means small diameter fibers having an average diameter not greater than about 100 microns, for example, having a diameter of from about 0.5 microns to about 50 microns. More specifically microfibers may also have an average diameter of from about 1 micron to about 20 microns. Microfibers having an average diameter of about 3 microns or less are commonly referred to as ultra-fine microfibers.

As used herein the term "multilayer laminate" means a laminate wherein some of the layers are spunbond (S) and some meltblown (M) such as a spunbond/meltblown/spunbond (SMS) laminate and others as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate in a manner described below. Such fabrics usually have a basis weight of from about 0.1 to 12 osy (about 3.4 to 400 gsm), or more particularly from about 0.4 to about 3 osy (about 14 to 100 gsm). Multilayer laminates may also have various numbers of meltblown layers or multiple spunbond layers in many different configurations and may include other materials like films (F) or coform materials, e.g: SMMS, SM, SFS, etc.

As used herein, the term "multilayered film" or multilayered filled film" means a film with multiple contacting adjacent layers, each layer is uniformly distributed in planar dimension of the film.

As used herein, the term "spunlaced fabrics" refers to a web of material consisting of one or more types of non-continuous fibers, where the fibers are hydroentangled to achieve mechanical bonding without binder materials or thermal bonding.

As used herein, the term "wet-laid fabrics" refers to fabrics formed by a process, such as a paper-making process, wherein fibers or filaments dispersed in a liquid medium are deposited onto a screen such that the liquid medium flows through the screen, leaving a fabric on the surface of the screen. Fiber bonding agents may be applied to the fibers in the liquid medium or after being deposited onto the screen. Wet-laid fabrics may contain natural and/or synthetic fibers.

As used herein, the term "hydroentangle" or "hydroentangling" refers to a process wherein a web of material consisting of one or more types of fibers or filaments are subjected to high-velocity water jets, which entangle the fibers to achieve mechanical bonding.

As used herein, the terms "breathable" and "microporous" refer to a material which allows the passage of vapor and/or gas therethrough, but forms a barrier against the passage therethrough of liquids. The term generally refers to a material which is permeable to water vapor having a minimum water vapor transmission rate (WVTR) of about 100 $g/m^2/24$ hours. The WVTR of a fabric is water vapor transmission rate which, in one aspect, gives an indication of how comfortable a fabric would be to wear. WVTR is measured as indicated below and the results are reported in $grams/m^2/24$ hours. However, often applications of breathable barriers desirably have higher WVTRs and breathable barriers of the present invention can have WVTRs exceeding about 300 $g/m^2/24$ hrs, 800 $g/m^2/24$ hrs, 1500 $g/m^2/24$ hrs or even exceeding 3000 $g/m^2/24$ hrs. Breathable films are well known in the art and may be produced by any known method.

As used herein the term "thermal point bonding" involves passing a fabric, web of fibers, or multiply fabrics and/or webs of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern is taught in U.S. Pat. No. 3,855,046 to Hansen and Pennings. Typically, the % bonding area varies from around 10% to around 30% of the area of the fabric laminate web. As is well known in the art, the bonding holds the laminate layers together as well as imparts integrity to each individual layer by bonding filaments and/or fibers within each layer.

As used herein, the term "ultrasonic bonding" means a thermal point bonding process performed, for example, by passing the fabric between a sonic horn and anvil roll as illustrated in U.S. Pat. No. 4,374,888 to Bornslaeger.

As used herein, "fugitive surfactant" and "surfactant" means a chemical agent that renders the polymer surfaces hydrophilic and can be extracted to some degree from those surfaces by aqueous fluids.

As used herein, the term "machine direction" or MD means the direction of a fabric in the direction in which it is produced. The term "cross machine direction" or CD means the opposite direction of the fabric, i.e. a direction generally perpendicular to the MD.

As used herein the term "recover" and "retract" refers to a contraction of a stretched material upon termination of a biasing force following stretching of the material by application of the biasing force. For example, if a material having a relaxed, unbiased length of one (1) inch was elongated 50% by stretching to a length of one and one half (1.5) inches the material would have a stretched length that is 150% of its relaxed length. If this exemplary stretched material contracted, that is recovered to a length of one and one tenth (1.1) inches after partial to complete release of the biasing and stretching force, the material would have recovered 80% (0.4 inch) of its elongation.

As used herein, a "micropore developing filler" is meant to include particulates and other forms of materials which can be added to a polymer and which will not chemically interfere with or adversely affect the extruded film made from the polymer but are able to be uniformly dispersed throughout the film. Generally, the micropore developing fillers will be in particulate form and usually will have somewhat of a spherical shape with average particle sizes in the range of about 0.5 to about 8 microns. The film will usually contain at least about 30% of micropore developing filler based upon the total weight of the film layer. Both organic and inorganic micropore developing fillers are contemplated to be within the scope of the present invention provided that they do not interfere with the film formation process, the breathability of the resultant film or its ability to bond to a fibrous polyolefin nonwoven web.

Figure 1:
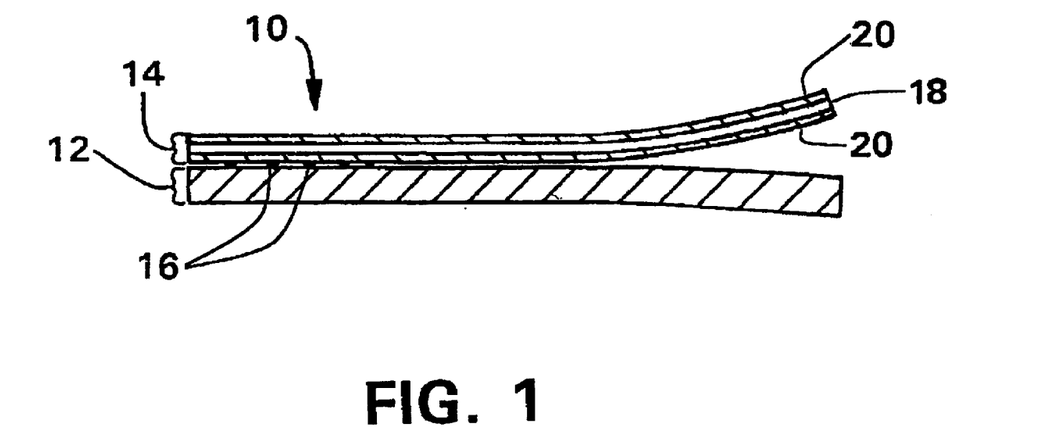
FIG. 1 depicts a portion of a cross-section of an embodiment of the laminate of the present invention.

Looking to FIG. 1, a laminate 10, in accordance with the present invention is depicted comprising a surfactant treated nonwoven web 12 bonded to a multilayered film 14. Bonding of the web 12 to the film 14 is accomplished at least in part at bond points 16 by thermal point bonding, i.e., through the use of heat and/or pressure as with heated bonding rolls, at least one of which is patterned. The multilayered film 14 comprises a plurality of layers which may include a core layer 18 and one or more skin layers 20 on either side of the core layer 18. Each skin layer 20 may further include extrudable thermoplastic polymers and/or additives that provide specialized properties to the film 14. As depicted in FIG. 1, at least one skin layer 20 (in the FIG. 1 embodiment two are depicted) and the nonwoven web 12 are positioned in a juxtaposed, face-to-face, or surface-to-surface relationship with respect to each other. The web 12 and the film 14, or both are joined to one another over the entire surface or at least at some portion of their respective surfaces, such as at thermal bond points 16. The web 12 or the film 14 of the laminate 10 may have a shape and size independent from the other. However, in many embodiments the web 12 and the film 14 are generally similar in shape and are coextensive with each other.

In some embodiments, as described below, the nonwoven web 12 may comprise a surfactant treated spunbond layer. Other embodiments include nonwoven webs 12 comprising at least one spunbonded layer in combination with one or more meltblown fabric layers, wherein one or more of the fabric layers are made hydrophilic by incorporating a surfactant in or on the respective fabrics thereby rendering the nonwoven web absorbent.

Figure 2:
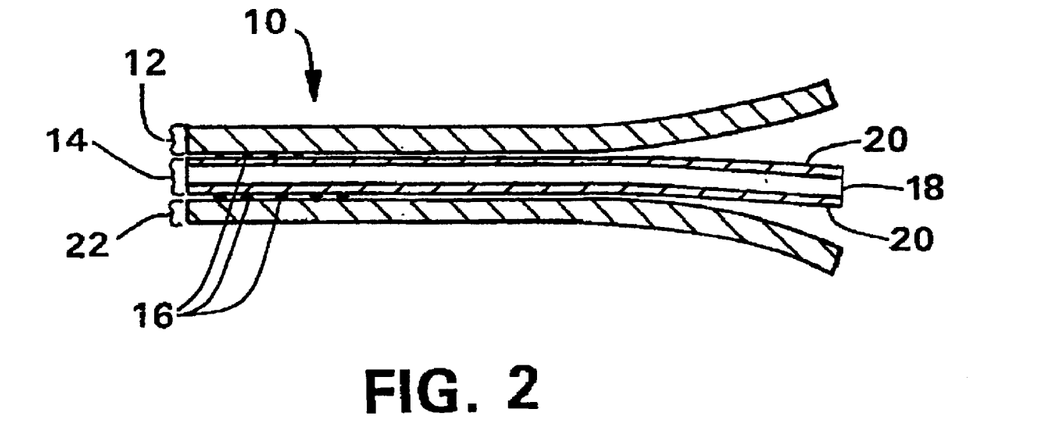
FIG. 2 depicts a portion of a cross-section of a further embodiment of the laminate of the present invention.

Further embodiments such as depicted in FIG. 2, contemplate that the multilayered film 14 may be sandwiched between two nonwoven webs 12 and 22. Each nonwoven web 12 and/or 22 may itself comprise a single layer of meltspun fabric, for example a spunbond or meltblown fabric, or each nonwoven web 12 and/or 22 may comprise a plurality of separate nonwoven webs wherein each separate nonwoven web 12 or 22 are any of identical webs, similar webs, or different webs. For instance, each of the webs 12, 22 may comprise a spunbond layer and a meltblown layer, or a first spunbond layer, a meltblown layer, and a second spunbond layer. Additional layers and combinations are possible as well, depending on the intended use of the product In any of the embodiments, any of the nonwoven webs may be treated with surfactant to become hydrophilic and any of the webs may be treated with other surface modifying agents.

Figure 3:
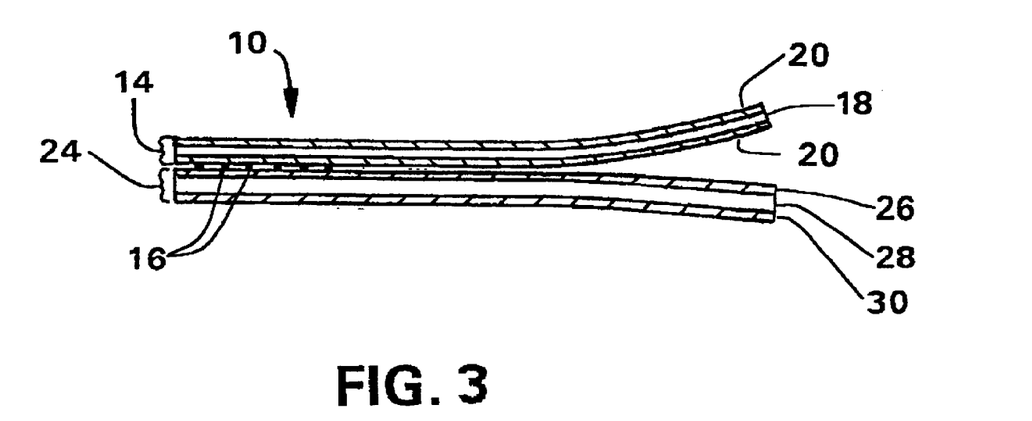
FIG. 3 depicts a portion of a cross-section of another embodiment of the laminate of the present invention.

FIG. 3 depicts an embodiment of the invention similar to FIG. 1, however FIG. 3 replaces the single layer nonwoven web with a multilayer nonwoven web 24. Any one or all of the layers of the nonwoven web 24 may be treated with a surfactant and adjacent layers of the nonwoven web 24 may be made of polymers that are thermally miscible. In the embodiment of FIG. 3, the nonwoven web 24 comprises a spunbond/meltblown/spunbond (SMS) laminate having a first spunbond layer 26, a meltblown layer 28, and a second spunbond layer 30. As in FIG. 1 the FIG. 3 film 14 comprises a plurality of layers which may include the core layer 18 and one or more skin layers 20 on either side of the core layer 18. Each skin layer 20 may include extrudable thermoplastic polymers and/or additives that provide specialized properties to the film 14. As depicted in FIG. 3, any of the embodiments contemplated may arrange the film 14 so that it forms an exterior surface of the laminate 10.

Figure 4:
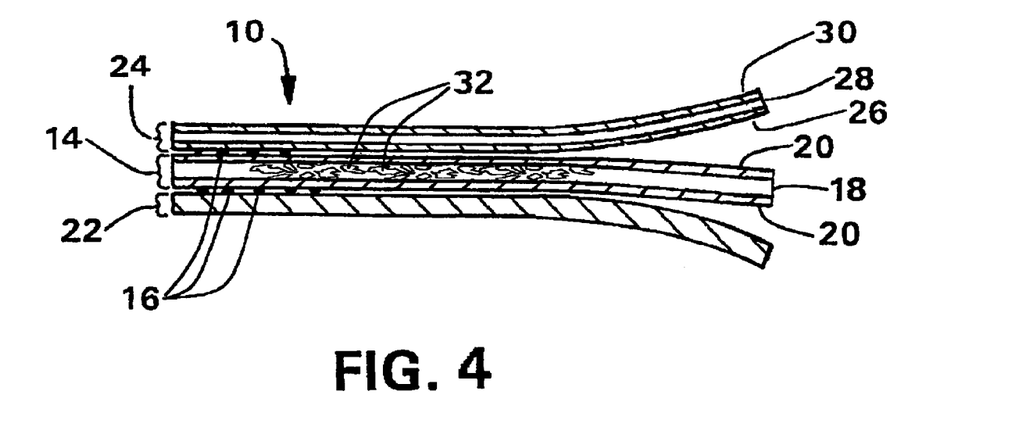
FIG. 4 depicts a portion of a cross-section of yet another further embodiment of the laminate of the present invention.

FIG. 4 depicts another embodiment which sandwiches the multilayered film 14 between at least one nonwoven web 22 (it should however be understood that nonwoven web 12 may be substituted) and at least one multilayered nonwoven web 24. Any one or all of the layers of any one of or all of the nonwoven webs may be treated with surfactant but at least one nonwoven layer in at least one nonwoven web is desirably hydrophilic. While various combinations are contemplated one possible embodiment of the laminate 10 comprises the nonwoven web 24 which itself comprises a spunbond/meltblown/spunbond (SMS) laminate of first spunbond layer 26, a meltblown layer 28, and a second spunbond layer 30 laminated to the film 14. The nonwoven web 12 is bonded to the opposite side of the film 14 thereby sandwiching the film 14 between webs 22 and 24. At least one of the layers 26, 28, or 30 is surfactant treated.

As should be evident from the above explanations and the FIGs., numerous combinations and quantities of single and/or multiple layer webs and films are possible. Furthermore, numerous possibilities exist with respect to which of these layers and/or webs also are pretreated with surfactant. In any event, in each of the embodiments, the film 14 may serve to block external liquid penetration through the laminate 10. As such, the film 14 is attached to at least one adjacent layer of the laminate 10. In any of the embodiments the film 14 may be attached to the nonwoven web 12, 22, and/or 24 of the laminate 10 by thermal point bonds 16.

In certain embodiments, the film 14 may comprise an extrudable polyolefin containing multiple layers, where at least one of those layers contains micropore developing filler or fillers. Looking still to FIG. 4, it can be seen that the core layer 18 of the film 14 may contain such micropore developing filler 32. The micropore developing filler 32 provides properties to the core layer 18 such as breathability to be obtained via proper processing. As such, this filler 32 may be dispersed throughout the core layer 18. Typically the films 14 are made breathable by the addition of the filler 32 to the film 14 during the film forming process and then by the subsequent stretching of the film so as create voids in and around the filler 32. This renders the film breathable and permits the transmission of water vapor and other gases through micropores developed in and through the film in the regions containing and proximate to the voids while normally inhibiting the transmission of liquids such as water. The micropore developing filler 32 may also be included in the skin layers 20 for desirable properties such as breathability, anti-block, improved attachment to nonwoven webs, and the like. Of course, all embodiments including those depicted in FIGS. 1–3, contemplate the use of such micropore developing filler 32.

Most typically, such filler material 32 used in the core layer 18 of the film 14 is primarily utilized in, for example, a weight percentage ranging from about 25% to about 60%, based upon the total weight of the layer 18. The amount of filler material 32 may vary widely as long as the desired degree of liquid impermeability of the entire film 14 is maintained.

Suitable polymers for the core layer 18 include polyethylene, blends of polyethylenes, polypropylene, blends of polypropylenes, blends of polyethylene and polypropylene, blend combinations of polyethylene or polypropylene with suitable amorphous polymers, copolymers made from ethylene and propylene monomers, and blends of such copolymers with polyethylenes or polypropylenes or suitable amorphous polymers, semi-crystalline/amorphous polymers, "heterophasic' polymers, or combinations thereof. Examples of useful polymers that can be included in the polymeric portion of the core layer 18 are EXXPOL®, EXCEED®, and EXACT™ polymers from Exxon Chemical Company of Baytown, Tex.; ENGAGE®), ACHIEVE®, ATTAIN®, AFFINITY®, and ELITE® polymers from Dow Chemical Company of Midland, Mich.; CATALLOY® polymers from Basell USA Inc. of Wilmington, Del. Other useful polymers include elastomeric thermoplastic polymers.

Each skin layer 20 may be made from polymers which provide such properties as antimicrobial activity, water vapor transmission, adhesion and/or antiblocking properties and may include micropore developing fillers 32. Suitable polymers for the skin layer 20 or layers 20 include polymers and polymer blends used alone or in combination of homopolymers, copolymers and blends of polyolefins, CATALLOY® polymers, ethylene vinyl acetate (EVA), ethylene ethyl acrylate (EEA), ethylene acrylic acid (EAA), ethylene methyl acrylate (EMA), ethylene butyl acrylate (EBA), polyester (PET), nylon (PA), ethylene vinyl alcohol (EVOH), polystyrene (PS), polyurethane (PU), and olefinic thermoplastic elastomers which are multistep reactor products wherein an amorphous ethylene propylene random copolymer is molecularly dispersed in a predominately semicrystalline high polypropylene monomer/low ethylene monomer continuous matrix.

For more detailed description of films having core and skin layers see U.S. Pat. Nos. 5,695,868, 6,075,179, and 6,238,767 to McCormack et al. assigned to common assignee which is incorporated herein by reference in its entirety.

Examples of some possible micropore developing filler materials 32 incorporated in the core layer 18 include calcium carbonate ($CaCO_3$), various kinds of clay, silica ($SO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivative, polymer particles, chitin and chitin derivatives. The micropore developing filler materials 32 may optionally be coated with a fatty acid, such as stearic acid, or a larger chain fatty acid such as behenic acid, which may facilitate the free flow of the particles (in bulk) and their case of dispersion into the polymer matrix. Silica containing fillers may also be present in an effective amount to provide antiblocking properties.

Filler materials that may be incorporated in the skin layer(s) 20 include calcium carbonate ($CaCO_3$), various kinds of clay, silica ($SO_2$), etc. Particularly useful fillers are silica containing fillers, such as diatomaceous earth, when present in effective amounts to provide anti-blocking properties to the film.

In one multilayered film 14, the core layer 18 may comprise a polyethylene filled with about 60% by weight calcium carbonate serving as the micropore developing filler 32. The skin layers 20 may contain appropriate CATALLOY® polymers. Such CATALLOY® polymers may contain copolymers of ethylene. The skin layers 20 may also contain additives to impart anti-blocking attributes. The ratio of the total of the skin layers 20 to the core layer 18 may be approximately 4.5 to 12% by weight. In other multilayered films 14 the core layer 18 is as described above but the skin layers 20 may contain polymeric blends of appropriate CATALLOY® polymers with EVA polymers with about 28% vinyl acetate content with or without the addition of diatomaceous earth or other additives to impart anti-blocking attributes.

It is contemplated that the absorbent component of the laminate 10 is any one of or all of the nonwoven webs 12, 22, and/or 24. The webs may be formed from a number of processes including, but not limited to, spunbonding and meltblowing processes. Regardless of the number of layers or their specific configuration, the actual materials used to manufacture any of the nonwoven webs may comprise monocomponent and/or multicomponent, or conjugate, synthetic filaments and/or fibers that may be produced from a wide variety of thermoplastic polymers that are known to form fibers or filaments.

Suitable polymers for forming the nonwoven webs of the present invention include, but are not limited to, polyolefins, e.g., polyethylene, polypropylene, polybutylene, and the like. Of the suitable polymers for forming conjugate fibers, particularly suitable polymers for the high melting component of the conjugate fibers include polypropylene, copolymers of propylene and ethylene and blends thereof, polyesters, and polyamides, more particularly polypropylene. Particularly suitable polymers for the low melting component include polyethylenes, more particularly linear low density polyethylene, high density polyethylene and blends thereof. Most suitable component polymers for conjugate fibers are polyethylene and polypropylene. Especially suitable polymers for forming the nonwoven webs include polymers of narrow molecular weight distribution such as metallocene catalyzed polypropylene, and in particular inelastic metallocene-catalyzed polypropylene. In addition, the polymer components may contain thermoplastic elastomers blended therein or additives for enhancing the crimpability and/or lowering the bonding temperature of the fibers, and enhancing the abrasion resistance, strength and softness of the resulting webs. Yet other suitable polymer additives include polybutylene copolymers and ethylene-propylene copolymers.

In some of the embodiments, one or more hydrophilic additives are added to the polymer melt in order to form hydrophilic meltspun fabrics. Particularly useful hydrophilic additives include surfactants that are nontoxic, have a low volatility and are sufficiently soluble in the molten or semi-molten polymers. Additionally, the hydrophilic additive is desirably thermally stable at temperatures up to 175 degree C. and sufficiently phase separates such that the additive migrates from the bulk of the polymer filament towards the surface of the polymer filament as the filament solidifies without requiring the addition of heat. Once at the polymer surface, the additive alters the polymer surface such that the surface of the polymer rapidly wets upon contact with (by reducing the surface tension of) an aqueous fluid. Such additives include, but are not limited to, one or a combination of additives selected from the following classes of additives: (i) polyoxyalkene modified fluorinated alkyls, (ii) polyoxyalkylene fatty acid esters, (iii) polyoxyalkylene modified polydimethyl siloxanes and PEG-terephthalate (polyethylene glycol modified terephthalate) and (iv) ethoxylated alkyl phenols. An example of a suitable polyoxyalkylene modified fluorinated alkyl is FC-1802, a product of the Minnesota Mining and Manufacturing Company. An example of a suitable polyoxyalkylene fatty acid ester is PEG-400 ML, a product of Henkel Corporation/Energy Group. An example of a suitable polyoxyalkylene modified polydimethyl siloxane is MASIL® SF-19, a product of PPG Industries. An example of suitable ethoxylated alkyl phenol is Triton® 102, a product of Union Carbide. The choice of one or more additives depends upon, for example, cost, compatibility with the polymeric material, and the overall contribution to the properties of the laminate. The treatment to render hydrophobic polymers hydrophilic by adding surfactant to the polymer melt is illustrated in patents such as Pike et al., U.S. Pat. No. 5,759,926 that is herein incorporated by reference in its entirety.

Additionally and/or alternatively, the hydrophilic additives, especially surfactants, may be added to the meltspun fabric following fabric formation. Suitable methods of applying the hydrophilic additives to a meltspun fabric include, but are not limited to, foam coating, spray coating, or solution coating. For those embodiments where the hydrophilic properties of the absorbent fabric are due to hydrophilic additives added on the surfaces of the fabric filaments, the hydrophilic additives may include any additive which is thermally stable at temperatures up to 60° C. Once on the filament surface, the additive changes the inherent hydrophobicity of the filament surface such that the filament surface wets upon contact with (by reducing the surface tension of) an aqueous fluid. Such additives include, but are not limited to, those identified above and having thermal stabilities up to 60° C. Any such additive is suitable for the present invention as long as it does not negatively impact desired properties of the resulting laminate. Further, the hydrophilic meltspun fabrics and other components comprising the absorbent laminate of the invention may also be treated with any known antistatic agent. The treatment to render hydrophobic polymers hydrophilic by surface treatment of the fibers is illustrated in patents such as Krzysik et al., U.S. Pat. No. 6,204,208 that is herein incorporated by reference in its entirety.

Generally, the concentration of the hydrophilic additive in or on the filaments or fibers that comprise the meltspun fabric (e.g., spunbonded filaments or meltblown microfibers) may comprise about 0.05% by weight to about 5.0% by weight Moreover, the concentration of the hydrophilic additive in or on the filaments or fibers that comprise the meltspun fabric may comprise about 0.1% by weight to about 1.5% by weight.

The choice of one or more hydrophilic additives depends upon, for example, cost, compatibility with the polymeric material, and the overall contribution to the properties of the finished drape. The hydrophilic meltspun webs provide superior liquid absorptivity to the laminates of the present invention compared to conventional, namely hydrophobic, spunbonded fabrics. For use as a surgical drape, the laminates of the present invention provide equivalent liquid absorptivity without being flammable compared to commercially available absorbent drapes. In some embodiments, the hydrophilic meltspun fabrics may have a basis weight of from about 15 to about 140 grams per square meter (gsm). In other embodiments, the hydrophilic meltspun fabrics may have a basis weight of from about 20 to about 60 grams per square meter (gsm).

The hydrophilic meltspun webs of the present invention may also be treated with or contain various chemicals in order to impart additional desirable characteristics. Any such chemical is suitable for the present invention as long as the chemical does not negatively impact desired properties of the laminate. For example, the hydrophilic meltspun webs may be treated with any known antistatic agent, fire retardant, or other desirable chemical finish. Furthermore, for hospital related end uses for the laminates of this invention, it may be desired to treat the webs so that they become electrically conductive to prevent the build-up of a static charge. One possible way to achieve this result is to apply a conventional salt solution, such as lithium nitrate, to the web of continuous filaments before or after formation of the meltspun fabric. As an embodiment, the surfactant and salt solution are combined and then applied to the meltspun fabric in a single treatment step.

In the practice of this invention, a single nonwoven web layer 12 may be laminated to a film layer 14, similar to that depicted in FIG. 1. An example of such is a spunbond (S)/film (F) laminate. Alternatively, a plurality of nonwoven web layers may also be incorporated into the laminate, similar to the FIGS. 2–4 embodiments according to the present invention. Examples of such materials can include, for example, SFS multilayered laminate composites. Additional examples include meltblown (M)/F laminates, SMS/F laminates. In fact, any combination of a surfactant treated nonwoven web, layer, or single layer within a nonwoven web coupled with a microporous film is contemplated In one possible embodiment, the laminate can be used as a surgical drape. In a surgical drape embodiment, the outermost layer that faces away from the patient may contain a hydrophilic meltspun web.

In the case where the laminate 10 consists of a hydrophilic meltspun fabric and a film (i.e., the FIG. 1 embodiment or a similar construction), the film should desirably contact the patient. The film may have projections as described in U.S. Pat. No. 5,546,960 or other three dimensional features that minimize contact with the patient. As a surgical drape the laminate of the present invention may also be provided with one or more fenestrations (not shown). In some such applications, each fenestration is generally sized for overlying the operating site of the patient and for providing a health care provider a means of accessing the site. The fenestration may extend through one or more or the surgical drape layers and may vary in size depending upon the intended use of the surgical drape. Additionally, the surgical drape may contain other components such as an incise material, a release layer over an incise material, a pouch for storing surgical equipment, and any other surgical drape component known to those of ordinary skill in the art. While this described embodiment is directed to surgical drapes there are many other applications for the laminates of the present invention. Other applications include, but are not limited to, patient prep pads, examination table covers, patient mattress bed covers or liners, and the like.

The components of the laminate of the present invention may be manufactured by any method of making similar laminates known to those of ordinary skill in the art. The hydrophilic meltspun fabric may be prepared by adding a hydrophilic chemical additive to the polymer melt and subsequently forming meltspun filaments or fibers. Alternatively, the hydrophilic chemical additive may be coated onto the meltspun fabric. These methods may also be used to render hydrophilic other nonwoven fabrics made from inherently hydrophobic polyolefins that are used in conjunction with the meltspun fabric in the absorbent drape. Thermal bonding together hydrophilic meltspun fabrics and films suitable for the invention may result by passing such materials through a nip formed by co-rotating heated rolls that are pressed together, by ultrasonic methods, and other means that join together in defined areas the adjacent facing surfaces of the hydrophilic meltspun fabric and the film.

Some of the previously disclosed embodiments of the present invention (not shown) use a multilayer film 14 comprising a particulate filled core layer 18 and a single skin layer 20. In at least one of the most basic configurations, one skin layer 20 is attached, usually simultaneously due to the coextrusion process, to a first exterior surface of the core layer 18 to form the multilayer film 14. In embodiments having this configuration, the multilayer film 14 defines an overall thickness where a first skin layer 20 defines a first skin thickness comprising about 10% or less than of the overall effective thickness of the multilayer film 14.

The effective thickness of a film is used to take in-to consideration the voids or air spaces in breathable film layers. For normal, non-filled, non-breathable films, the actual thickness and effective thickness of the film will typically be the same. However, for filled films that have been stretch-thinned, as described herein, the thickness of the film will also include air spaces. In order to disregard this added volume, the effective thickness is calculated according to the test method described below.

For example, in some embodiments the thickness of the first skin layer 20 may be manufactured so as to not exceed about 5 microns. In other embodiments the thickness of the first skin layer 20 may be manufactured so as to not exceed about 3 microns. In still other embodiments the thickness of the first skin layer 20 may be manufactured so as to not exceed about 2 microns. These thicknesses can be reached by stretching the film 14 to such a degree so as to thin the multilayer film 14 to within the dimensions defined herein.

In the case of a multilayer film 14 comprising a core layer 18 sandwiched between two skin layers 20 as shown in each of FIGS. 1–4, a possible embodiment provides that the first skin and the second skin layers 20 have a combined thickness which does not exceed about 15% of the overall thickness of the multilayer film 14. Another embodiment provides that the first skin and the second skin layers 20 have a combined thickness which does not exceed more than about 8% of the overall thickness of the multilayer film 14. Other embodiments provide that the first skin and the second skin layers 20 have a combined thickness which does not exceed more than about 6% of the overall thickness of the multilayer film 14. The skin layers 20 could also be made not to exceed about 3% of the overall thickness of the multilayer film 14.

Moreover, there is no requirement that each skin layer 20 be the same dimension. For instance, one of the skin layers 20 could range from about 0 to about 15% whereas the other skin layer 20 could range from about 15% to about 0%. In some embodiments the film 14 in the final laminate may have a film thickness of from about 0.3 mil (about 8 microns) to about 1 mil (0.025 mm). In other possible embodiments, the film 14 may have a film thickness of from about 0.5 mil (about 13 microns) to about 0.8 mil (about 20 microns). Also, the film 14 in the final laminate may have a film basis weight of less than about 25 grams per square meter (gsm). Moreover, the film 14 in the final laminate may have a film basis weight of less than about 20 gsm. Again, these thickness and basis weight ranges can be used for any of the embodiments contemplated herein.

In any event, once the particulate filled film 14 has been formed, it is then stretched to create voids around or in close proximity to the filler particles throughout the core layer 18 which provides the layer 18 with its breathability. Proper selection of type and amount of polymer and fillers in each skin layer 20 ensures that these layers 20 do not prevent transmission of water vapor and other gases through film 14 after stretching. In forming the individual layers 28 and 30 of the film 14, the layers 28 and 30 may be coextruded to ensure interfacial contact and alleviate processing complexity. Processes for forming film 14 are generally known. The film 14 can be made from either cast or blown film equipment, can be coextruded and can be embossed if so desired. Additionally, the film 14 can be stretched or oriented by passing the film 14 through a film stretching unit. Generally, this stretching may take place in the CD or MD or both.

The inventors discovered that by stretching the multilayered film 14 described in the embodiments and thermally bonding them under specific conditions with a meltspun web pretreated with a surfactant results in a laminate that reliably prevents the strikethrough of aqueous based fluids. The composition of the layers in the film and the percentage thickness of each layer are factors in maintaining a measure of breathability while consistently retaining liquid strike through protection after the stretched film is thermally point bonded to a nonwoven web made absorbent via treatment of the web by a surfactant. Additionally important is that in stretching the film, it retains significant continuity in the skin layers adjacent to the surfactant treated nonwoven web while the core layer is made microporous.

The inventors have further discovered that allowing the multilayered films to retract after stretching and before thermally bonding them with a surfactant treated meltspun fabric comprises one method to produce laminates that reliably prevent the strikethrough of aqueous based fluids. Retraction of stretched multilayered films has been mentioned in connection with stretched multilayered films containing micropore developing fillers, as for example in the previously cited U.S. Pat. No. 6,045,900. Such retraction has been observed to improved physical attributes in the resultant film such as greater elongation prior to rupture in the direction of stretching. With respect to the invention, applying appropriate processing conditions (e.g. stretching and retraction) to the extruded film before lamination to surfactant treated nonwoven webs have been identified as factors that enhance and/or maintain desired fluid barrier properties.

Figure 5:
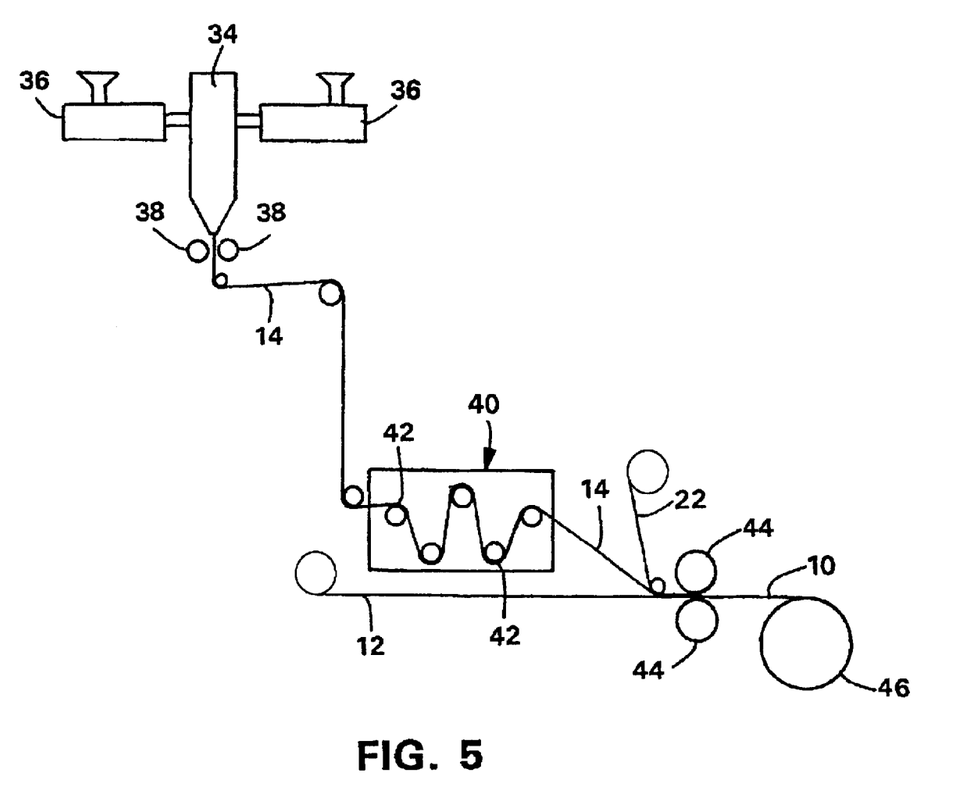
FIG. 5 depicts one possible process for forming the multilayer films depicted in FIG. 3 and 4.

Referring to FIG. 5, a process for forming the laminate 10 of FIG. 2 and 4 is shown. A coextrusion film apparatus 34 forms the film 14 that has multiple layers consisting of skin and core layers (not shown). Typically the apparatus 34 will include two or more polymer extruders 36. In one method of fabrication, the film 14 is extruded into a pair of nip or chill rollers 38 one of which may be patterned so as to impart an embossed pattern to film 14. This is particularly advantageous to reduce the gloss of the film and give it a matte finish. In another method the film 14 is extruded onto a chilled roll which can have a smooth or matte finish. Typically, the film 14, as initially formed, will have an overall thickness of approximately 25 to 60 micrometers with, in the case of multilayer films, the total skin or bonding layer having an initial thickness that may be about 3% to 30% of the total thickness, for example.

From the coextrusion film apparatus 34 the film 14 is directed to a film stretching unit 40 such as a machine direction orienter (MDO), which is a commercially available device from vendors such as the Marshall and Williams Company of Providence, R.I. Such an apparatus 40 has a plurality of paired stretch rolls 42. These pairs of stretch rolls move at predetermined speeds that may rotate faster, slower or at the same speed relative to each other. Typically the stretch rolls move at a progressively faster speeds to progressively stretch and thin the film 14 in the machine direction of the film which is the direction of travel of the film 14 through the process as shown in FIG. 5. Some of the stretch rolls 42 may optionally move at slower speeds compared to preceding stretch rollers 42 in order to allow retraction of film 14 also in the machine direction. The stretch rolls 42 are generally heated for processing advantages. In addition, the unit 40 may also include rolls (not shown) upstream and/or downstream from the stretch rolls 42 that may be used to preheat the film 14 before stretching and heat or cool it after stretching.

After exiting the film stretching unit 40 the stretched film 14 is allowed to retract by an amount substantially less than the amount it was stretched. This retraction is achieved by rotating the heated calender rolls 44 so that the speed ratio of the film in the nip formed by rolls 44 to the speed of the last set of stretching rollers in the stretching unit 40 is less than 100%, and may desirably range between about 70 to 90%.

One possible film 14 can be seen, inter alia, on FIG. 4 wherein the film comprises a multilayered film 14 with the core layer 18 comprising a polyethylene filled with about 60% by weight calcium carbonate which serves as the micropore developing filler 32 and the skin layers 20 comprising a polymeric blend of 50% EVA with about 28% vinyl acetate content and 50% CATALLOY® KS-357P and 5% by weight of antiblock additive. The ratio of the skin layers to the core layer may range from about 4.5 to 12% by weight The initial thickness of the skin layers 20 on either side of the core layer 18 may be the same. The removal of such fillers 32 from the skin layers 20 is possible via in-line film formation and lamination to nonwovens.

Still looking to FIG. 5, once the multilayered film 14 is extruded, it is stretched via the stretching unit 40 with stretch roll temperatures of about 160° F. to about 220° F. After the film 14 has been sufficiently thinned but before the stretched film passes through the last set of stretch rolls 42, the film 14 is retracted slightly while maintained between the temperatures of about 160° F. to about 220° F. After the film 14 exits the stretching unit 40 it is further retracted before it is thermally bonded to the nonwoven web or webs 12, 22, and/or 24 at the calendering rolls 44. This accumulative retraction is believed to deliver the beneficial effect of thickening and reducing any holes formed in the skin layers 20. Films subjected to this treatment may be made to possess breathability between about 300–3500 WVTR.

In some embodiments, the multilayered film 14 and the nonwoven webs for example 12 and 22 are next brought together and laminated to one another using heated calendering rolls 44 consisting of a smooth steel roll and a patterned steel roll. These rolls 44 form a discrete bond pattern with a prescribed bond surface area for the resultant laminate. Generally, the maximum bond point surface area for a given area of surface on one side of the laminate 10 will not exceed about 50% of the total surface area. There are a number of discrete bond patterns which may be used, all generally having a bond point surface area between 15 and 30%. Once the laminate 10 exits the calendering rolls 44, it may be wound up into a roll 46 for subsequent processing. Alternatively, the laminate 10 may continue in-line for further processing or conversion.

A similar process may also be used to create a laminate 10 of a film 14 and a single nonwoven web for example, web 12 as shown in FIG. 1 and 3. The modifications to the previously described process include use of only one nonwoven web layer 12, the arrangement of the nonwoven web 12 and the film 14 so that the desired skin layer 20 is adjacent to the desired face of the nonwoven web 12, and adjustment of bonding temperatures in calendering rolls 44 so that the thermal point bonding occurs between the film 14 and the nonwoven 12.

The temperatures to which the film 14 is heated while stretching will depend on the composition of the film as well as the breathability and other desired end properties of the laminate 10. In most cases the film will be heated to a temperature no higher than 5 degrees C. below the melting point of the core layer in the film. The purpose for heating the film is to allow it to be stretched quickly without causing film defects. The amount of stretching will depend on the polymeric composition, but, in general, the film may be stretched to about 300% or more of its original length (that is, a one cm length, for example, will be stretched to 3 cm) but less than the amount that tends to result in film defects. For most applications, for example, the stretch will be to at least 200% of the original film length and, frequently, in the range of about 250% to 500%. Lamination of nonwoven webs to the film is achieved via heat and compressive force imparted by the calendering rolls 44. The strength of the thermal point bond that attaches the hydrophilic nonwoven web and the film together is measured by peel strength. After thermal bonding the laminate 10 may be heated or cooled, if desired, by methods (not shown) known to those skilled in the art.

The present invention is described above and below by way of examples, which are not to be construed in any way as imposing limitations upon the scope of the invention. On the contrary, it is to be clearly understood that other embodiments, modifications, and equivalents thereof which, after reading the description herein, may suggest themselves to those skilled in the art without departing from the spirit of the present invention and/or the scope of the appended claims. In the examples reference in made to certain data that was measured by certain tests. These tests are described below.

Film Thickness The overall thickness of the film was measured in cross-section from photomicrographs. One method for obtaining the photomicrographs used a Field Emission Scanning Electron Microscopy (FESEM) and the following preparation procedure. Each film sample was submersed in liquid nitrogen and cut on impact with a razorblade. The freshly cut cross-section was mounted to a specimen stub in an upright position using copper tape. Scanning electron photomicrographs were taken at approximately 2000× magnification to show each respective film structure. Three separate specimens and two corresponding photomicrographs for each specimen were prepared for each multilayer film sample and measurements were taken directly off these photographs. A reference scale was superimposed on each photomicrograph for calibration of the measurements. At least three measurements for each microphotograph were made thereby creating a set of at least eighteen data points or measurements for each film sample to be used in determining the thickness. From each set of data points for a corresponding film sample an average thickness value for each film sample was calculated in microns.

Effective Thickness The effective thickness of a film material was calculated by dividing the basis weight of the film by the density of the polymer(s) and fillers forming the film. Densities can be readily determined from vendor information or commonly available references. To obtain the effective thickness of a film material in units of inches, the weight per unit area measured in ounces per square yard (osy) was multiplied by 0.001334 (a metric to English conversion factor) and the result was divided by the density of the polymer formulation in grams per cubic centimeter (g/cc).

Water Vapor Transmission Rate Test: The water vapor transmission rate (WVTR) for the sample materials was calculated in general accordance with ASTM Standard E96- 80. Circular samples measuring three inches (7.62 cm) in diameter were cut from each of the test materials and a control, which was a piece of CELGARD® 2500 film from Hoechst Celanese Corporation of Sommerville, N.J. CELGARD® 2500 film is a microporous polypropylene film. Three specimens were prepared for each material. The test dishes were number 681 Vapometer cups distributed by Thwing-Albert Instrument Company of Philadelphia, Pa. One hundred milliliters (ml) of distilled water was poured into each Vapometer cup and individual samples of the test materials and control material were placed across the open tops of the individual cups. Screw-on flanges were tightened to form a seal along the edges of each cup (no sealant grease was used), leaving the associated test material or control material exposed to the ambient atmosphere over a 6.5 centimeter (cm) diameter circle having an exposed area of approximately 33.17 square centimeters. The cups were weighed and placed in a forced air oven set at a temperature of 37 degree C. (100 degree F.). The oven was a constant temperature oven with external air circulating through it to prevent water vapor accumulation inside. A suitable forced air oven is, for example, a Blue M Power-O-Matic 60 oven distributed by Blue M Electric Co. of Blue Island, Ill. After 24 hours, the cups were removed from the oven and weighed again. The preliminary test water vapor transmission rate values were calculated as follows:

$$\text{Test WVTR}=(\text{grams weight loss over 24 hours})\times 315.5(g/m^2/24\ hrs)$$

The relative humidity within the oven was not specifically controlled. Under predetermined set conditions of 100 degree F. (37 degree C.) and ambient relative humidity, the WVTR for the CELGARD® 2500 film control has been determined to be 5000 grams per square meter for 24 hours ($g/m^2/24$ hrs). Accordingly, the control sample was run with each test and the preliminary test values were corrected to set condition using the following equation:

$$\text{WVTR}=(\text{Test WVTR/control WVTR})\times 5000\ g/m^2/24\ hrs\ (g/m^2/24\ hrs)$$

Other methods for determining WVTRs are possible using other testing systems. One specific test system used to measure the WVTR values for some of the films and laminates of the Examples and Comparative Examples was the PERMATRAN-W 100K water vapor permeation analysis system, commercially available from Modern Controls, Inc. (MOCON) of Minneapolis, Minn.

Blood Strikethrough Test: Blood Barrier results were measured in accordance with ASTM F1670-95. In this test a specimen is subjected to a synthetic blood simulant for a specified time and pressure sequence. Visual observation alone is used to determine when, or if, penetration occurs. Results are reported as pass ("compliant") or fail.

Hydrostatic Pressure (Hydrohead) Test: The hydrostatic pressure test measures the resistance of nonwoven materials to the penetration of water under low hydrostatic pressure. This test procedure is in accordance with Method 5514— Federal Test Methods Standard No. 191A, AATCC Test Method 127-89 and INDA Test method 80.4-92, modified to include a support of synthetic fiber window screen material available at any hardware store. The test head of a Textest FX-300 Hydrostatic HeadTester, available from Schmid Corp., having offices in Spartanburg, S.C. was filled with purified water. The purified water was maintained at a temperature between 65 degree F. and 85 degree F. (18.3 and 29.4 degree C.), which was within the range of normal ambient conditions (about 73 degree F. (23 degree C.) and about 50% relative humidity) at which this test was conducted. An 8 inch by 8 inch (20.3 cm by 20.3 cm) square sample of the test material was placed such that the test head reservoir was covered completely. The sample was subjected to a standardized water pressure, increased at a constant rate until leakage was observed on the outer surface of the sample material or the desired hydrostatic pressure was achieved. Hydrostatic pressure resistance was measured at the first sign of leakage in three separate areas of the sample. This test was repeated for five specimens of each sample material. The hydrostatic pressure resistance results for each specimen were averaged and recorded in millibars (mbar). A higher value indicates greater resistance to water penetration.

Peel Test To determine peel strength a laminate is tested for the amount of tensile force which will pull the layers of the laminate apart. Values for peel strength are obtained using a 4 inch (10.2 cm) width of fabric, a wider clamp width and a constant rate of extension of 12 inches (30.5 cm) per minute. The film side of the specimen is covered with masking tape or some other suitable material to prevent the film from ripping apart during the test. The masking tape is on only one side of the laminate and so does not contribute to the peel strength of the sample. The sample is delaminated by hand a sufficient amount to allow it to be clamped into position. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Philadelphia, Pa. 19154, which have at least 4 inches (10.2 cm) long parallel clamps. The sample specimen is then pulled apart at 180 degrees of separation at a rate of 300 nun (about 12 inches) per minute and the tensile strength recorded in grams force per 4 inches as the average based on the generated curve.

Absorbency Test: This test is performed according to Federal Government Specification UU-T-595b. It is made by cutting a test sample 4 inches by 4 inches (10.2 cm by 10.2 cm), weighing it, and then saturating it with water for three minutes by soaking. The sample is then removed from the water and hung by one corner for 30 seconds to allow excess water to be drained off. The sample is then reweighed, and the difference between the wet and dry weights is the water pickup of the sample expressed in grams per 4" by 4" sample. The percent absorbency (% Absorbency) is obtained by dividing the total water pick-up by the dry weight of the sample and multiplying by 100.

EXAMPLES OF THE INVENTION

All the films in the Examples were multilayered films with two outer or skin layers in each example being the same and sandwiching an intermediate or core layer. All films were cast films and all the films were embossed prior to stretching to yield a matte finish on one of the exterior surfaces. Tables 1, 2 and 3 contain measurements and determinations made according to the methods previously described that characterize selected attributes of the laminates of the films.

Example 1

Figure 6:
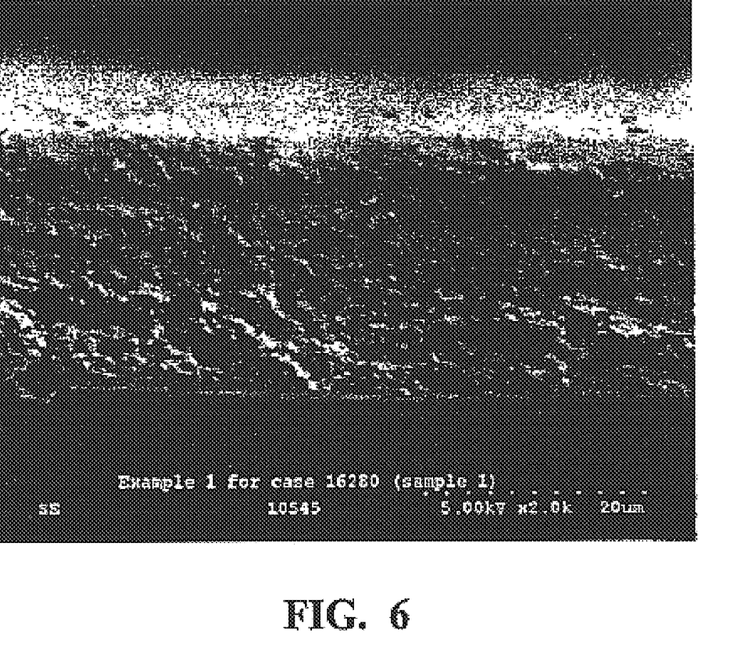
FIGS. 6–9 depict photomicrographs of various examples of film cross-sections

For this example, the film used was a cast coextruded skin-core-skin or "ABA" film having a core layer which contained by weight approximately 39% Dow 3310, approximately 2.8% Dowlex 4012, both available from DowChemical Co., 0.2% of CIBA B900 anti-oxidant and 58% Supercoat®, a ground, stearic acid coated $CaCO_3$, available from English China Clay. The two outer or skin layers on opposite sides of the core layer comprised 4.5 percent of a polymeric blend of 50% 760.36 ethylene vinyl acetate (EVA) from Exxon Chemical Company and 50% KS357P CATALLOY® polymer from Basell USA Inc. (Wilmington, Del.), with approximately 4 percent Ampacet 10115 antiblock agent. Ampacet 10115 antiblock agent comprises approximately 20 weight percent Superfloss® diatomaceous earth and is available from Ampacet Corporation of Tarry-town, N.Y. The three layer film was extruded using cast extrusion equipment of the type described to give an unstretched film having a thickness of approximately 51 microns (2 mils). The film was wound up on a roll and later sent through a Machine Direction Orienter (MDO). The MDO unit was preheated to 185 to 210 degree F. (85 degree C. to 99 degree C.) and the film was stretched approximately 4× while at these temperatures. By saying the film was stretched 4× it is meant that, for example, a 1 meter long film would be stretched to a resultant length of 4 meters. Each of the two skin layers comprised approximately 2.25 percent of the overall film by weight. As a result, the core layer represented approximately 95.5 percent of the film by weight. After stretching but before thermal bonding with the nonwoven webs, the film was allowed to retract 20% without the application of additional heat. The basis weight of the final film was approximately 21 grams per square meter (gsm) and the actual thickness of the resultant film was approximately 20 microns. See FIG. 6 for a photomicrograph of this example.

The nonwoven webs consisted of a 0.4 osy spunbond and a 0.8 osy spunbond/meltblown/spunbond (SMS) nonwoven web with a surfactant treatment. The spunbond, about 14 gsm basis weight, was made of filaments of about 1.8 denier extruded from a copolymer of ethylene with 3.5% propylene (resin 6D 43, available from Union Carbide Corp.) which were thermally point bonded. The SMS fabric had a basis weight of 0.8 osy and consisted of 0.29 osy spunbond outer layers from appropriate polypropylene resins such as Montell PF 304 and 0.22 meltblown center layer from appropriate polypropylene resins such as Exxon 3746G. After the spunbond and meltblown layers were thermal point bonded, the SMS laminate was dipped in a bath of Gemtex SM-33 surfactant and water and subsequently dried to add about 1% Gemtex SM-33 by weight onto the nonwoven fabric.

The stretched film and the nonwoven webs were then thermally bonded together at calender temperatures of 245° F. (118 degree C.) for the pattern roll and 260° F. (127 degree C.) for the anvil roll at a speed of 800 FPM (244 meters per minute).

Example 2

The laminate of Example 2 was made in the same manner as Example 1 except that the skin layer formulation consists of 96% CATALLOY KS-084P polymer from Basell USA.

Example 3

Figure 7:
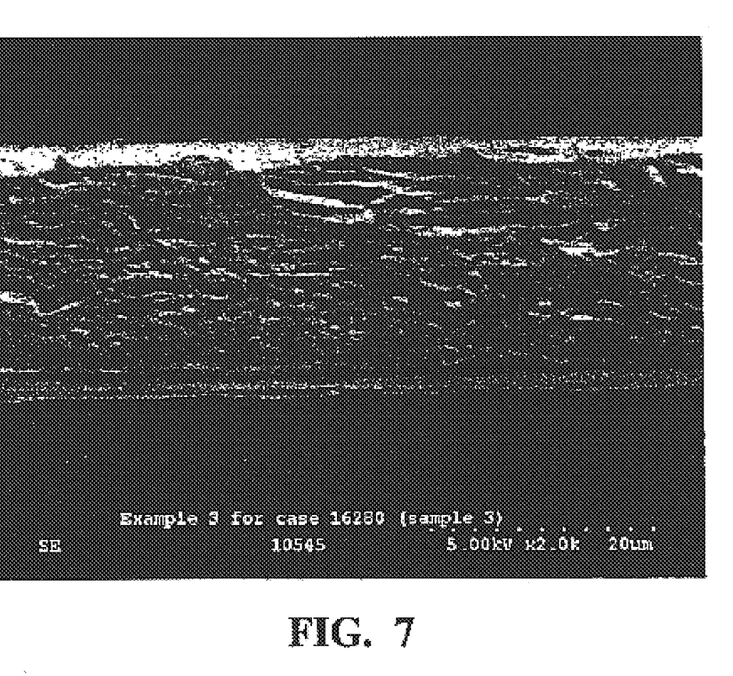

The laminate of Example 3 was made in the same manner as Example 1 except that the core layer of the film was produced using 35% Supercoat and approximately 62% Dow 3310. The resulting film was measured to have a basis weight of approximately 17.3 gsm and an actual film thickness of about 19 microns. See FIG. 7 for a photomicrograph of this example.

Example 4

The film for the laminate consisted of a core layer which contained by weight approximately 42% Dow 3310 available from DowChemical Co., similar trace amount and type of antioxidant as described in Example 1, and 58% $CaCO_3$ as also described in Example 1. The two outer or skin layers on opposite sides of the core layer comprised 6 percent of KS084P CATALLOY® polymer from Basell USA Inc. (Wilmington, Del.). No diatomaceous earth or other anti-slip agents or fillers were added to the skin layer material. The three-layer film was extruded using cast extrusion equipment of the type described to give an unstretched film having a thickness of approximately 51 microns (2 mils). The film was wound up on a roll and later sent through a Machine Direction Orienter (MDO). The MDO unit stretch rolls were heated progressively from approximately 150 to 210 degree F. (66 degree C. to 99 degree C.) The film was stretched approximately 4× while at these temperatures. Each of the two skin layers comprised approximately 3 percent of the overall film by weight. As a result, the core layer represented approximately 94 percent of the film by weight. After stretching but before thermal bonding with the nonwoven webs, the film was allowed to retract 10% without the application of additional heat. The resulting film was measured to have a basis weight of approximately 23.1 gsm and an actual film thickness of about 23 microns.

The nonwovens of Example 1 were thermally bonded to the film using calender rolls similar to that of Example 1 but with the patterned roll at 230 degree F. (110 degree C.), the smooth roll at 180 degree F. (82 degree C.) and a bonding speed of 330 FPM.

Attributes of the resulting laminate were measured using Hydrohead and Peel tests. Because of the time delay specified in ASTM 1670 test method, the barrier attributes of the laminate were accessed by Hydrohead testing. A value of at least 300 mbar was selected as a value to prescreen samples for subsequent testing using ASTM 1670 procedures. (Samples with tested Hydrohead values below 300 mbars tend to fail the ASTM 1670 tests.) The laminate of this comparative example did not consistently achieve the desired 300 mbar value. The Peel test accessed the strength of thermal bonding of the surfactant treated 0.8 osy SMS to the film. Results are recorded in Table 1.

Example 5

The film consisted of the same materials as Example 4 and was stretched and bonded as described in Example 4 with the following differences 3.4× stretch and 18% retraction. Laminate attributes for the Peel and hydrohead tests are recorded in Table 1 and Table 2 respectively. The laminates of this example consistently achieved Hydrohead values of 300 mbar or greater. The Peel values assessing the thermal bond between the film and the surfactant treated nonwoven are significantly greater. Because the film was stretched less and retracted more, the resulting film was measured to have a basis weight of approximately 29.7 gsm and an actual film thickness of about 25 microns. This greater thickness is believed to be the reason for the difference in Hydrohead and Peel values.

Example 6

The film and resulting laminate for Example 6 are the same as Example 4 except that the skin layers comprise 12% by weight of the film. Since the Peel values are similar for Comparative Examples 3 and 7, the extra amount of polymer in the skin layers is concluded to be in access of that needed to promote acceptable attachment of the hydrophilic nonwoven. WVTR values were not determined for this sample. The resulting film was measured to have a basis weight of approximately 20.2 gsm and an actual film thickness of about 23 microns.

Comparative Example 1

Figure 8:
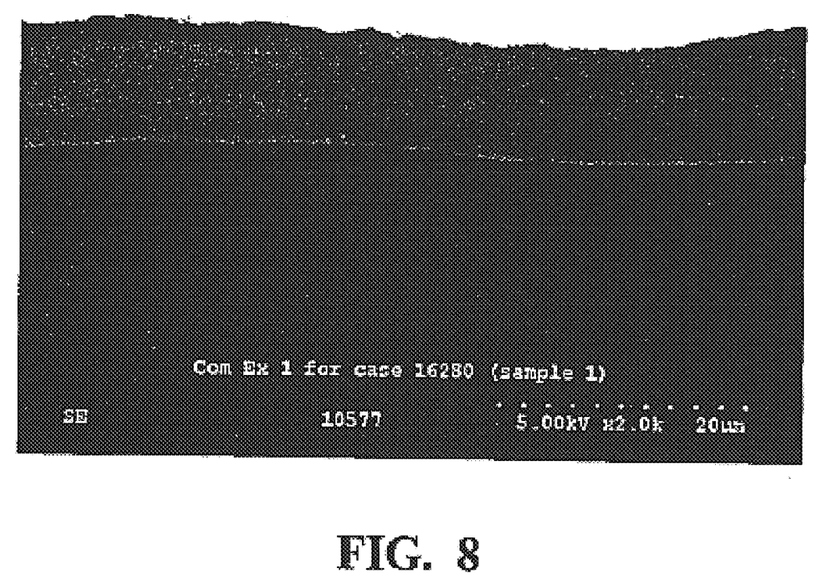

This laminate consisted of a 1.0-osy hydrophilic spunbond thermally laminated to a multilayered film that contained no fillers. The hydrophilic spunbond was made according to the method described for when hydrophilic chemical additives are added to the polymer melt as described in U.S. Pat. No. 5,901,706. The hydrophilic chemical additive was MASIL® SF-19, a surfactant product of PPG Industries. The multilayered film consisted of a 0.6 ml film having two skin layers, each contributing 30% by weight to the film's composition. The each skin layer was made of 65% of CATALLOY® polymer 71-1, 25% of Exxon's 3445, 5% of low density polyethylene (Quantum Chemical's NA 334) and 5% of TiO2 concentrate (Ampacet 110210, 50/50 blend in polypropylene). The core layer was made of 25% of CATALLOY® polymer 71-1, 30% of Exxon's 3445, 5% of low density polyethylene (Quantum Chemical's NA 334) and 40% of TiO2 concentrate. The film was stretched 1.5× at temperatures of about 140–160° F. (60–71 degree C.). The resulting film was measured to have a basis weight of approximately 15.4 gsm and an actual film thickness of about 10 microns. See FIG. 8 for a photomicrograph of this example.

The nonwoven and the film were thermal bonding together using heated steel calender rolls consisting of a patterned roll having a measured temperature of 174° F. (79 degrees C.) and a smooth roll having a measured temperature of 146 degrees F. (63 degree C.) at a line speed of 25 FPM (7.6 meters per minute). The nonwoven contacted the pattern roll and the film contacted the anvil roll.

The calculated effective thickness for this film compares favorably with the actual measured thickness, as is shown in Table 3; the difference being 14%. This difference is attributed to variations in individual measured basis weight values of film specimens used to determine the average GSM value, variations in density values reported in published references for the filler components, and undetectable micropores. This difference is at least half as small as the 31% or greater differences determined between the effective and actual thickness values for each of the other samples (Examples 1, 3 to 6, Comparative Example 2, and presumably Example 2 which is similar to Example 1). This distinction between the actual and effective film thickness values for Comparative Example 1 for all the other examples supports the existence of microporous structures.

Comparative Example 2

Figure 9:
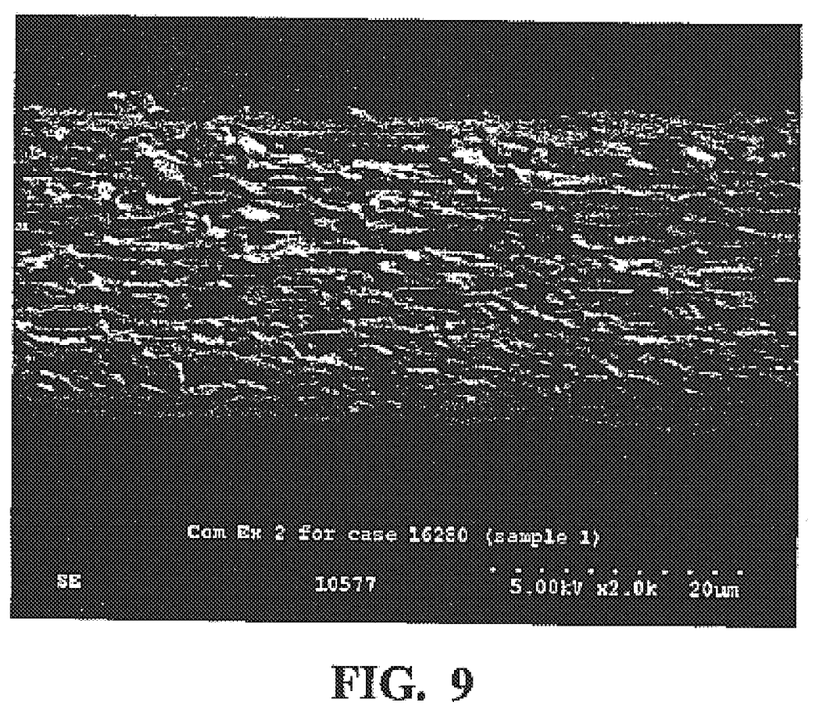

This laminate consisted of the 1.0-osy hydrophilic spunbond thermal bonded to a multilayered film that contained calcium carbonate ($CaCO_3$) similar to that used for Example 1 as the micropore developing filler in all film layers. The hydrophilic spunbond was the same as described in Comparative Example 1. The multilayered film consisted of skin layers made of 60% $CaCO_3$ in an custom formulated high viscosity butene-rich APAO polymer from Huntsman and a core layer of 55% $CaCO_3$, 22% Dowlex 2035 LLDPE and 23% Affinity EG-8200 LLDPE, both from Dow Chemical. Each skin layer made up 10% of the film by weight. The film was stretched approximately 3× at temperatures of about 140–160° F. The resulting film was measured to have a basis weight of approximately 29.2 gsm and an actual film thickness of about 22 microns. See FIG. 9 for a photomicrograph of this example.

The nonwoven and the film were thermal bonding together using heated steel calender rolls consisting of a patterned roll having a measured temperature of 200° F. degrees and a smooth roll having a measured temperature of 170 degree ° F. and a line speed of 150 FPM. The nonwoven contacted the pattern roll and the film contacted the anvil roll.

TABLE 1

| Sample | % Absorbency | Peel (Avg; gm) | WVTR | ASTM 1670 Results |
|---|---|---|---|---|
| Comparative Example 1 | 556 | 67 | Less than 100 | Pass |
| Comparative Example 2 | 563 | 58 | 1818 | Fail |
| Example 1 | 475 | 32 | 3520 | Pass |
| Example 2 | 475 | 52 | 1000 | Pass |
| Example 3 | 475 | 56 | 101 | Pass |
| Example 4 | 475 | 45 | Less than 100 | — |
| Example 5 | 475 | 95 | 113 | — |

TABLE 2

| Sample | All Specimens Passing 300 Hydrohead value | Final Film GSM | Actual Final Film Thickness (microns) |
|---|---|---|---|
| Example 1 | Yes | 20.8 | 20.4 |
| Example 4 | No | 23.1 | 22.7 |
| Example 5 | Yes | 29.7 | 25.4 |
| Example 6 | No | 20.2 | 22.8 |

TABLE 3

| Sample | Actual Avg. Total Film Thickness | Effective Total Thickness | Effective Skin/total film thickness ratio, % |
|---|---|---|---|
| Comparative Example 1 | 10.0 | 11.4 | 76 |
| Comparative Example 2 | 22.0 | 15.2 | 19 |
| Example 1 | 20.4 | 10.1 | 8 |
| Example 3 | 18.8 | 11.4 | 6 |
| Example 4 | 22.7 | 12.6 | 12 |
| Example 5 | 25.4 | 16.2 | 12 |
| Example 6 | 22.8 | 11.8 | 23 |

While the invention has been described in connection with some possible embodiments, it is to be understood that the invention is not limited to those embodiments. On the contrary, all alternatives, modifications and equivalents as can be included within the scope and spirit of the invention defined in the appended claims are intended to be covered.

What is claimed is:

1. A method of making a laminate comprising:
   treating a nonwoven web with a surfactant;
   heating a multilayer film having at least one layer comprising a micropore developing filler;
   stretching the multilayer film to a percentage of its unstretched state during the heating step; and
   thermally bonding the multilayer film to the surfactant treated nonwoven web thereby making the laminate compliant with ASTM F1670-95.

2. The method of claim 1 further comprising retracting the multilayer film a lesser percentage prior to bonding the film to the nonwoven web.

3. The method of claim 1 wherein at least one layer of the multilayer film comprises about 30% to about 75% by weight polyolefin resin and from about 70% to about 25% by weight of filler having an average size less than about 10 microns.

4. The method of claim 1 further comprising bonding a second nonwoven web to the laminate such that the multilayer film is disposed between the two nonwoven webs.

5. The method of claim 1 wherein the multilayer film is maintained at temperatures between about 160 degrees F. and about 220 degrees F. while the film is stretched.

6. The method of claim 2 wherein the multilayer film is maintained at temperatures between about 160 degrees F. and about 220 degrees F. while the film is retracted.

7. The method of claim 1 wherein the multilayer film is stretched at least about 200 percent of its original length.

8. The method of claim 1 wherein the multilayer film is stretched between about 250 to about 500 percent of its original length.

9. The method of claim 1 wherein the multilayer film is stretched at least about 300 percent of its original length.

10. The method of claim 1, wherein the laminate, tested per NFPA 702-1980, meets the 20 second or greater flame propagation criteria for a Class 1 material.

11. A method of making a laminate comprising:
    treating at least one surface of a nonwoven web with a surfactant;
    forming an outer layer from the treated nonwoven web;
    heating a multilayer film having at least one layer comprising a micropore developing filler and at least one skin layer;
    stretching the multilayer film to at least 200 percent of its unstretched state while applying heat to the film;
    juxtaposing the multilayer film onto the treated nonwoven web so that the skin layer contacts the surfactant treated surface; and
    thermally bonding the film to the surfactant treated surface thereby making the laminate compliant with ASTM F1670-95.

12. The method of claim 11 further comprising retracting the multilayer film a lesser percentage prior to bonding the film to the nonwoven web.

13. The method of claim 12 wherein the film is maintained at temperatures between about 160 degrees F. and about 220 degrees F. while the film is retracted.

14. The method of claim 11 further comprising retracting the multilayer film about 20 percent of its final stretched state.

15. The method of claim 11, wherein the laminate, tested per NFPA 702-1980, meets the 20 second Or greater flame propagation criteria for a Class 1 material.

16. The method of claim 11, wherein the surfactant is coated onto the surface of the nonwoven web.

17. The method of claim 11, wherein film is maintained at temperatures between about 160 degrees F. and about 220 degrees F. while the film is stretched.

18. The method of claim 11, for the manufacture of a surgical drape.

19. The method of claim 11 wherein a water vapor transmission test (WVTR), as measured by test method ASTM Standard E96-80 yields a value of greater than about 300 g/m2/day.

* * * * *